US009500831B2

(12) United States Patent
Haataja (10) Patent No.: US 9,500,831 B2
(45) Date of Patent: Nov. 22, 2016

(54) CABLE PAYOUT CASSETTE WITH SINGLE LAYER CABLE STORAGE AREA

(71) Applicant: ADC TELECOMMUNICATIONS, INC., Berwyn, PA (US)

(72) Inventor: Timothy Haataja, Prior Lake, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 567 days.

(21) Appl. No.: 13/872,592

(22) Filed: Apr. 29, 2013

(65) Prior Publication Data

US 2013/0287359 A1    Oct. 31, 2013

Related U.S. Application Data

(60) Provisional application No. 61/640,422, filed on Apr. 30, 2012.

(51) Int. Cl.
*G02B 6/44* (2006.01)

(52) U.S. Cl.
CPC ........... *G02B 6/4453* (2013.01); *G02B 6/4457* (2013.01)

(58) Field of Classification Search
None
See application file for complete search history.

(56) References Cited

U.S. PATENT DOCUMENTS

| 342,354 | A | 5/1886 | Harper |
|---|---|---|---|
| 415,423 | A | 11/1889 | Smith |
| 1,137,133 | A | 4/1915 | Hamelback |
| 1,276,825 | A | 8/1918 | Swope |
| 1,588,577 | A | 6/1926 | Heifler |
| 1,592,030 | A | 7/1926 | Langsner |
| 1,858,371 | A | 5/1932 | Lutz |
| 2,206,352 | A | 7/1940 | Hellmann |
| 2,260,109 | A | 10/1941 | Amdal |
| 2,440,974 | A | 5/1948 | Resch |
| 2,605,060 | A | 7/1952 | Bell |
| 2,752,106 | A | 6/1956 | Thompson |

(Continued)

FOREIGN PATENT DOCUMENTS

| EP | 0 531 628 A1 | 3/1993 |
|---|---|---|
| JP | 2-296201 | 12/1990 |

(Continued)

OTHER PUBLICATIONS

International Search Report and Written Opinion for PCT/US2013/038651 mailed Aug. 27, 2013.

(Continued)

*Primary Examiner* — Tina Wong
(74) *Attorney, Agent, or Firm* — Merchant & Gould P.C.

(57) ABSTRACT

A payout cassette for a cable, which extends between first and second ends, stores and pays-out the cable. The cassette includes a storage area and a transitioning area. The storage area stores a stored portion of the cable between first and second generally parallel cable constraining surfaces that are spaced a distance from each other. The distance is sufficiently large to allow a single cable thickness to slide between the cable constraining surfaces and is sufficiently small to prevent another cable thickness from crossing over the signal cable thickness within the storage area. Thus, the storage area includes a single cable layer and thereby keeps the cable from becoming tangled. The transitioning area is adapted to transition the cable from the stored portion within the storage area to a paid-out portion of the cable that is external to the storage area. The transitioning area is at least partially positioned within an interior of the storage area.

20 Claims, 9 Drawing Sheets

(56) References Cited

U.S. PATENT DOCUMENTS

| | | |
|---|---|---|
| 2,874,918 A | 2/1959 | Steiber |
| 2,905,409 A | 9/1959 | Sheldon |
| 3,015,384 A | 1/1962 | Kellogg |
| 3,120,355 A | 2/1964 | Bowman |
| 3,208,121 A | 9/1965 | Price |
| 3,632,061 A | 1/1972 | Roseboom |
| 3,822,834 A | 7/1974 | Fjarlie |
| 3,831,879 A | 8/1974 | Miller et al. |
| 3,843,071 A | 10/1974 | Graham |
| 4,008,791 A | 2/1977 | Shafii-Kahany et al. |
| 4,055,314 A | 10/1977 | Kovaleski |
| 4,108,390 A | 8/1978 | Hayes |
| 4,111,380 A | 9/1978 | Heuckroth |
| 4,186,897 A | 2/1980 | Brown |
| 4,222,535 A | 9/1980 | Hosbein |
| 4,273,392 A | 6/1981 | Stinson |
| 4,282,954 A | 8/1981 | Hill |
| 4,301,611 A | 11/1981 | Lapinski |
| 4,436,224 A | 3/1984 | McInerny |
| 4,565,333 A | 1/1986 | Meneian |
| 4,664,260 A | 5/1987 | Stokes |
| 4,936,452 A | 6/1990 | Pauley |
| 4,978,191 A | 12/1990 | Hasegawa et al. |
| 5,022,600 A | 6/1991 | Blanc et al. |
| 5,058,259 A | 10/1991 | Araki et al. |
| 5,069,523 A | 12/1991 | Finzel et al. |
| 5,078,466 A | 1/1992 | MacCulloch |
| 5,098,028 A | 3/1992 | Ida et al. |
| 5,165,543 A | 11/1992 | Heyda et al. |
| 5,265,822 A | 11/1993 | Shober, Jr. et al. |
| 5,268,986 A | 12/1993 | Kakii et al. |
| 5,277,314 A | 1/1994 | Cooper et al. |
| 5,294,068 A | 3/1994 | Baro et al. |
| 5,305,937 A | 4/1994 | Barnett |
| 5,332,171 A | 7/1994 | Steff |
| 5,335,874 A | 8/1994 | Shrum et al. |
| 5,367,827 A | 11/1994 | Tajima et al. |
| 5,388,781 A | 2/1995 | Sauber |
| 5,450,509 A | 9/1995 | Davis |
| 5,481,607 A | 1/1996 | Hsiao |
| 5,494,446 A | 2/1996 | DeLucia et al. |
| 5,544,836 A | 8/1996 | Pera |
| 5,598,987 A | 2/1997 | Wachowicz |
| 5,607,316 A | 3/1997 | Ishikawa |
| 5,630,456 A | 5/1997 | Hugo et al. |
| 5,641,067 A | 6/1997 | Ellis |
| 5,669,571 A | 9/1997 | Graybill |
| 5,679,015 A | 10/1997 | Schauer |
| 5,689,605 A * | 11/1997 | Cobb et al. ............ 385/135 |
| 5,758,834 A | 6/1998 | Dragoo et al. |
| 5,772,146 A | 6/1998 | Kawamoto et al. |
| 5,797,558 A | 8/1998 | Peterson et al. |
| 5,802,237 A | 9/1998 | Pulido |
| 5,857,285 A | 1/1999 | Little |
| 5,913,487 A | 6/1999 | Leatherman |
| 5,915,062 A | 6/1999 | Jackson et al. |
| 5,915,641 A | 6/1999 | Barberg |
| 5,921,497 A | 7/1999 | Utley, Jr. |
| D412,439 S | 8/1999 | Cormack |
| 5,993,229 A | 11/1999 | Tanaka et al. |
| 5,996,930 A | 12/1999 | Katayama et al. |
| 6,015,110 A | 1/2000 | Lai |
| 6,019,308 A | 2/2000 | Huang |
| D422,170 S | 4/2000 | Harris, Jr. |
| 6,077,108 A | 6/2000 | Lorscheider et al. |
| 6,215,938 B1 | 4/2001 | Reitmeier et al. |
| 6,220,413 B1 | 4/2001 | Walters et al. |
| 6,250,578 B1 | 6/2001 | Manda |
| 6,260,781 B1 | 7/2001 | Cooper |
| 6,305,958 B1 | 10/2001 | Maegawa et al. |
| 6,311,007 B1 * | 10/2001 | Daoud ............ 385/135 |
| 6,325,665 B1 | 12/2001 | Chung |
| 6,328,243 B1 | 12/2001 | Yamamoto |
| 6,349,893 B1 | 2/2002 | Daoud |
| 6,361,237 B1 | 3/2002 | Salmela |
| 6,375,109 B1 | 4/2002 | Liao |
| 6,405,961 B1 | 6/2002 | Mastrangelo |
| 6,422,503 B1 | 7/2002 | Hoo Kong |
| 6,433,274 B1 | 8/2002 | Doss et al. |
| 6,434,313 B1 | 8/2002 | Clapp, Jr. et al. |
| 6,484,958 B1 | 11/2002 | Xue et al. |
| 6,501,898 B1 | 12/2002 | Engberg et al. |
| 6,522,826 B2 | 2/2003 | Gregory |
| 6,572,393 B2 | 6/2003 | Kawamura |
| RE38,211 E | 8/2003 | Peterson et al. |
| 6,612,515 B1 | 9/2003 | Tinucci et al. |
| 6,616,080 B1 | 9/2003 | Edwards et al. |
| 6,643,443 B2 | 11/2003 | Holman et al. |
| 6,643,444 B1 | 11/2003 | Putnam |
| 6,643,445 B2 | 11/2003 | Bumgarner et al. |
| 6,733,328 B2 | 5/2004 | Lin et al. |
| 6,744,954 B1 | 6/2004 | Tanaka et al. |
| 6,795,633 B2 | 9/2004 | Joseph, II |
| 6,819,848 B2 | 11/2004 | Takahashi |
| D501,722 S | 2/2005 | Zimmerman |
| 6,856,748 B1 | 2/2005 | Elkins, II et al. |
| 6,871,812 B1 | 3/2005 | Chang |
| 6,915,058 B2 | 7/2005 | Pons |
| 6,997,410 B1 | 2/2006 | Huang |
| 7,017,846 B2 | 3/2006 | Tsoi et al. |
| 7,032,854 B2 | 4/2006 | Marsden |
| 7,036,761 B2 | 5/2006 | Washington et al. |
| 7,086,512 B2 | 8/2006 | Shack et al. |
| 7,104,491 B2 | 9/2006 | Vinding |
| 7,116,883 B2 | 10/2006 | Kline et al. |
| 7,120,349 B2 | 10/2006 | Elliott |
| 7,182,286 B2 | 2/2007 | Huang |
| 7,229,042 B2 | 6/2007 | Thebault et al. |
| D551,477 S | 9/2007 | Kikuchi |
| 7,266,283 B2 | 9/2007 | Kline et al. |
| 7,315,681 B2 | 1/2008 | Kewitsch |
| 7,357,666 B2 | 4/2008 | Wu |
| 7,369,739 B2 | 5/2008 | Kline et al. |
| 7,460,753 B2 | 12/2008 | Kewitsch |
| 7,497,351 B2 | 3/2009 | Amundson et al. |
| 7,548,679 B2 | 6/2009 | Hirano et al. |
| 7,599,598 B2 | 10/2009 | Gniadek et al. |
| 7,627,218 B2 | 12/2009 | Hurley |
| 7,665,901 B2 | 2/2010 | Kewitsch |
| 7,680,386 B2 | 3/2010 | Hurley |
| 7,715,679 B2 | 5/2010 | Kowalczyk et al. |
| 7,756,379 B2 | 7/2010 | Kowalczyk et al. |
| 7,869,682 B2 | 1/2011 | Kowalczyk et al. |
| 8,238,707 B2 | 8/2012 | Smrha et al. |
| 8,474,742 B2 | 7/2013 | Smrha |
| 8,720,810 B2 | 5/2014 | Whitaker |
| 8,800,910 B2 | 8/2014 | Shepherd |
| 2002/0122643 A1 | 9/2002 | Bueschelberger et al. |
| 2003/0059192 A1 | 3/2003 | Johnson |
| 2003/0089818 A1 | 5/2003 | Reau et al. |
| 2003/0095773 A1 | 5/2003 | Ichinari et al. |
| 2004/0211851 A1 | 10/2004 | Barton et al. |
| 2005/0167544 A1 | 8/2005 | Elliott et al. |
| 2005/0247813 A1 | 11/2005 | Kovacevich et al. |
| 2005/0263640 A1 | 12/2005 | Vanderslice |
| 2006/0045458 A1 | 3/2006 | Sasaki et al. |
| 2006/0151654 A1 | 7/2006 | Pitcher |
| 2006/0196989 A1 | 9/2006 | Bartley et al. |
| 2006/0264921 A1 | 11/2006 | Deutsch et al. |
| 2007/0189829 A1 | 8/2007 | Matsushita et al. |
| 2007/0196053 A1 | 8/2007 | Kewitsch |
| 2007/0278227 A1 | 12/2007 | Damaghi et al. |
| 2008/0019642 A1 | 1/2008 | Kewitsch |
| 2008/0273844 A1 | 11/2008 | Kewitsch |
| 2008/0292261 A1 | 11/2008 | Kowalczyk et al. |
| 2009/0060441 A1 | 3/2009 | Kowalczyk et al. |
| 2009/0065629 A1 | 3/2009 | Veit |
| 2009/0074370 A1 | 3/2009 | Kowalczyk et al. |
| 2009/0097797 A1 | 4/2009 | Kewitsch |
| 2009/0140093 A1 | 6/2009 | Wu |
| 2009/0324189 A1 | 12/2009 | Hill et al. |
| 2010/0054680 A1 | 3/2010 | Lochkovic et al. |
| 2010/0329621 A1 | 12/2010 | Makrides-Saravanos et al. |
| 2011/0024543 A1 | 2/2011 | Smrha |

(56) References Cited

U.S. PATENT DOCUMENTS

| | | |
|---|---|---|
| 2011/0024544 A1 | 2/2011 | Smrha et al. |
| 2011/0073700 A1 | 3/2011 | Godett et al. |
| 2011/0085775 A1 | 4/2011 | Van Zuylen |
| 2011/0154867 A1 | 6/2011 | Fawcett et al. |
| 2011/0297781 A1 | 12/2011 | Peters |
| 2012/0168554 A1 | 7/2012 | Blunt et al. |
| 2012/0205477 A1 | 8/2012 | Whitaker |
| 2013/0161430 A1 | 6/2013 | Weissbrod |
| 2013/0233962 A1 | 9/2013 | Wells |
| 2013/0284843 A1 | 10/2013 | Mertesdorf |
| 2013/0284844 A1 | 10/2013 | Holmberg et al. |
| 2013/0306780 A1 | 11/2013 | Marcouiller et al. |
| 2014/0027560 A1 | 1/2014 | Flood |
| 2014/0131505 A1 | 5/2014 | Gonzalez et al. |
| 2014/0161411 A1 | 6/2014 | Slater et al. |

FOREIGN PATENT DOCUMENTS

| | | |
|---|---|---|
| JP | 5-303018 | 11/1993 |
| JP | 2000-284129 | 10/2000 |
| JP | 2001-91753 | 4/2001 |
| JP | 2001-169452 | 6/2001 |
| JP | 2001-339837 | 12/2001 |
| JP | 2003-29059 | 1/2003 |
| JP | 2003-329850 | 11/2003 |
| JP | 2003-329851 | 11/2003 |
| JP | 2008-197530 | 8/2008 |
| WO | WO 99/41183 | 8/1999 |
| WO | WO 2006/015343 A2 | 2/2006 |
| WO | WO 2006/078007 A1 | 7/2006 |

OTHER PUBLICATIONS

Catalogue-Fastening Solutions—RICHCO—(Version JPG)—p. 227, 3 pages (Date Unknown).

Decoiler Devices/Traverse Arms/Accessories, http://replay.web.archive.org/20060518044402/https://weldingsupply.securesites.com/, 4 pages (May 18, 2006).

Decoiler Devices/Traverse Arms/Accessories, https://weldingsupply.securesites.com/yeoweld-fax.html, 5 pages (Date Printed May 2, 2011).

Fiber Management, Richco, p. 211 (Date Unknown).

Fiberlaunch, 4 pages (Copyright 2010).

Fibre Fastening and Routing Components, Richco, pp. 54-72 (Date Unknown).

Fibre Winding Reel, Europlus Technologies plc, 2 pages (Date Unknown).

Still images from video located at http://www.igus.com/ApplicationCorner/igus%20Videos/E-Chain/Excellent%20quality/EChainSystems_for_machinetools.wmv, 6 pages (Downloaded Dec. 2009).

Still images from video located at http://www.igus.com Dec. 8, 2009—igus_12HMInews, 3 pages (Downloaded Dec. 2009).

Telescent Catalog Fiber Optic Connectivity, pp. 1-39 (Copyright 2007).

* cited by examiner

CABLE PAYOUT CASSETTE WITH SINGLE LAYER CABLE STORAGE AREA

CROSS REFERENCE TO RELATED APPLICATIONS

This application claims the benefit of U.S. Provisional Application No. 61/640,422, filed Apr. 30, 2012, and titled "CABLE PAYOUT CASSETTE WITH SINGLE LAYER CABLE STORAGE AREA," the disclosure of which is hereby incorporated herein by reference.

BACKGROUND

Spools, reels, cassettes, and cartridges can be used to store telecommunications cable (e.g., electrical cable and/or fiber optic cable). The spools include a hub or a drum about which the cable is wound. The hub of the spools is often cylindrical, and the cable is often wrapped around the cylindrical hub in a predominantly circumferential manner. By winding up the cable on the spool, the cable can be compactly stored and transported, protected from tangling and kinking, and kept ready for easy deployment.

SUMMARY

An aspect of the present disclosure relates to a payout cassette (i.e. a cartridge, a dispenser, etc.) for a telecommunications cable. The telecommunications cable extends between a first end and a second end. The payout cassette pays-out the telecommunications cable when the first end of the telecommunications cable is pulled away from the payout cassette. The cassette also stores the telecommunications cable. The telecommunications cable has a cross-dimension. The cassette includes a storage area and a transitioning area. The storage area is adapted to store a stored portion of the telecommunications cable. The storage area includes a first cable constraining surface that is spaced a distance from a second cable constraining surface. The storage area extends between the first and the second cable constraining surfaces. The first and the second cable constraining surfaces are positioned generally parallel to each other. The distance is sufficiently large to allow the cross-dimension of the telecommunications cable to slide between the first and the second cable constraining surfaces and is sufficiently small to prevent a first portion of the stored portion of the telecommunications cable from crossing over a second portion of the stored portion of the telecommunications cable within the storage area. Thus, the storage area includes a single layer of the telecommunications cable and thereby keeps the telecommunications cable from becoming tangled. The transitioning area is adapted to transition the telecommunications cable from the stored portion within the storage area to a paid-out portion of the telecommunications cable that is external to the storage area. The transitioning area is at least partially positioned within an interior of the storage area.

Other aspects of the present disclosure include the transitioning area having a first cable guide that may be spaced from a rotatable ring and may extend circumferentially around the rotatable ring along a first arc segment. The first arc segment may be concentric with the rotatable ring. The first cable guide may be spaced from the rotatable ring by a passage distance that provides sufficient space to route a single strand of the telecommunications cable between the first cable guide and the rotatable ring. A second cable guide may be positioned immediately adjacent the rotatable ring and may extend circumferentially around the rotatable ring along a second arc segment. The second cable guide may have a clearance with the rotatable ring. The clearance might not be sufficient in size to position a strand of the telecommunications cable within. The first and/or the second cable guides may be attached to a base of the payout cassette. The payout cassette may further include a third cable guide that may be in the form of a slot (i.e., a slit) or a channel. The third cable guide may include a straight segment and/or a curved segment that may be tangent to the straight segment. The curved segment may generally follow and continue along a path of the passage distance between the first cable guide and the rotatable ring. Along the slot or the channel of the third cable guide, the telecommunications cable may be elevated above the storage area. The third cable guide may continue until it reaches an exterior of the payout cassette at an exit.

Still other aspects of the present disclosure include a payout cassette that includes a telecommunications cable and a housing for storing and deploying the telecommunications cable. The housing may include a base portion and a cover. The base portion may include a cavity with a perimeter and a wrapping area within the perimeter of the cavity. The telecommunications cable may be initially loaded in the cavity adjacent the perimeter in a series of loops that may be positioned within the cavity one layer deep. An initial loop may begin at a cable passage adjacent the perimeter that may extend to an exterior of the payout cassette. The initial loop may be positioned within the cable passage (i.e., an entrance passage) and wrapped adjacent the perimeter until the initial loop has extended around the perimeter. Cable wrapping may continue with a second loop that may be positioned adjacent the initial loop and may follow the initial loop as it extends around the perimeter. Likewise, the cable wrapping may continue with a third loop that follows the second loop, a fourth loop that follows the third loop, etc. In certain embodiments, the initial loop is initially wrapped in contact with the perimeter, thereby maximizing a length of the initial loop. Likewise, the second loop may be in contact with the initial loop and thereby include a maximum length of the telecommunications cable. Likewise, the third loop may be in contact with the second loop, and the fourth loop may be in contact with the third loop, etc.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

According to the principals of the present disclosure, an example cassette assembly 100 is adapted to pay-out an example telecommunications cable 500. The cassette assembly 100 can pay-out an extended length of the telecommunications cable 500 without disconnecting the telecommunications cable 500 from a first end 502 (i.e. a paid-out end). The cassette assembly 100 can pay-out the extended length of the telecommunications cable 500 without disconnecting the telecommunications cable 500 from a second end 504 (i.e. a base end). In particular, the paid-out end 502 can be pulled from the cassette assembly 100 at various lengths including the extended length to bring the paid-out end 502 of the telecommunications cable 500 to a desired location.

As depicted, the cassette assembly 100 does not require a rotary union or substantial accumulated twist in the telecommunications cable 500, but rather loops 510 of a stored portion 520 of the telecommunications cable 500 within a storage area 110 of the cassette assembly 100 are reduced in length (i.e., circumference) while the cassette assembly 100 is paying-out a paid-out portion 530 of the telecommunications cable 500, as illustrated by changes in routing of the telecommunications cable 500 between FIGS. 5 and 6 and FIGS. 7 and 8. In particular, the loops 510 of the stored portion 520 of the telecommunications cable 500 tighten around a wrapping surface 122 of a wrapping area 120 within the storage area 110 when the cassette assembly 100 pays-out the telecommunications cable 500 (see FIG. 6). The telecommunications cable 500 is thereby transferred from the stored portion 520 to a transitional portion 525 and then to the paid-out portion 530. In the depicted embodiment, the transitional portion 525 is adjacent an inner-most loop 510i and the base end 504 is adjacent an outer-most loop 510o. In the depicted embodiment, the paid-out end 502 is continuously connected to the base end 504 while the telecommunications cable 500 is being paid-out. Thus, a first device, connected to the first end 502, may be continuously connected to a second device, connected to the second end 504, while the telecommunications cable 500 is being paid-out and/or stored. Likewise, the first device, connected to the first end 502, may be continuously connected to the telecommunications cable 500 while the telecommunications cable 500 is being paid-out and/or stored, and/or the second device, connected to the second end 504, may be continuously connected to the telecommunications cable 500 while the telecommunications cable 500 is being paid-out and/or stored.

Turning now to FIGS. 1-9, the example cassette assembly 100 is illustrated, according to the principles of the present disclosure. As depicted, the cassette assembly 100 includes a terminal 150. As depicted, the terminal 150 is not substantially extendable from the cassette assembly 100. As depicted, the terminal 150 is generally stationary with the cassette assembly 100. In certain embodiments, the terminal 150 may be fixed with a main housing 200 of the cassette assembly 100. As depicted, the terminal 150 is attached to the housing 200 by a terminal portion 540 (e.g., a base cable portion) of the telecommunications cable 500. The terminal 150 can be connectorized by a fiber optic connector and/or a fiber optic adaptor. The terminal 150 can be permanently or semi-permanently connected to a fiber optic component, a fiber optic network, the second device, etc. If it is desired to change the position of the first end 502, the terminal 150 can remain connected to the fiber optic component, the fiber optic network, the second device, etc.

To accommodate the first end 502 changing position, particularly when the change in position results in a difference in length between the terminal 150 (and/or the second end 504) from the first end 502, individual loops $510_{1-4}$ of the loops 510 of the stored portion 520 of the telecommunications cable 500 may become smaller and thereby transfer cable length to the paid-out portion 530 of the telecommunications cable 500. In certain embodiments, a number N of loops $510_{1-N}$ does not change as the telecommunications cable 500 is paid-out over a pay-out range (i.e., starting from a fully retracted configuration to a fully deployed configuration). In the depicted embodiment, the telecommunications cable 500 extends continuously between the first end 502 and the second end 504. In preferred embodiments, pulling the first end 502 actuates the cassette assembly 100. When the cassette assembly 100 actuates, the housing 200 typically remains stationary.

Figure 1:
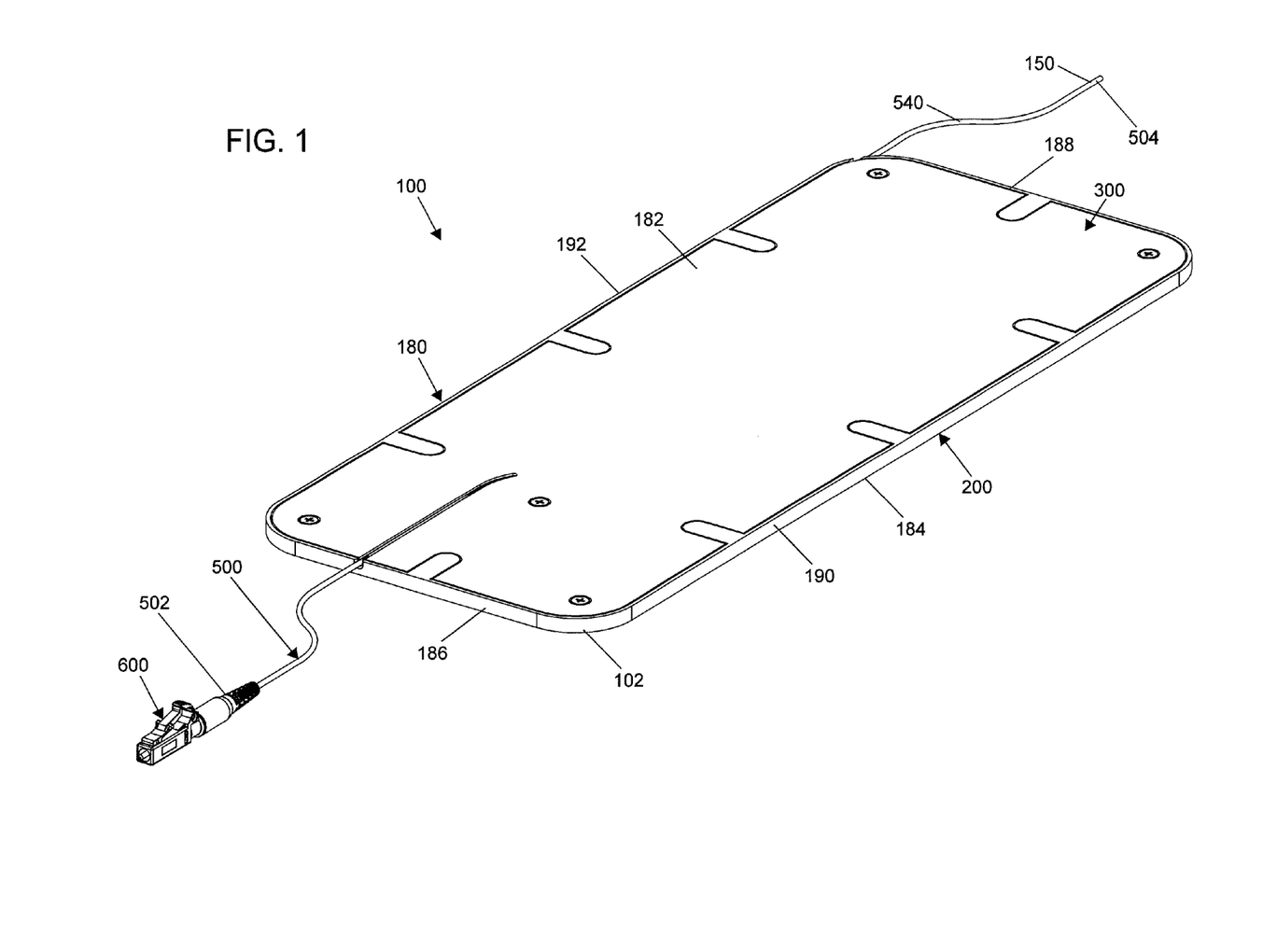
FIG. 1 is a perspective view of a payout cassette according to the principles of the present disclosure, the payout cassette storing a stored portion of a telecommunications cable and paying out a paid-out portion of the telecommunications cable.
Figure 2:
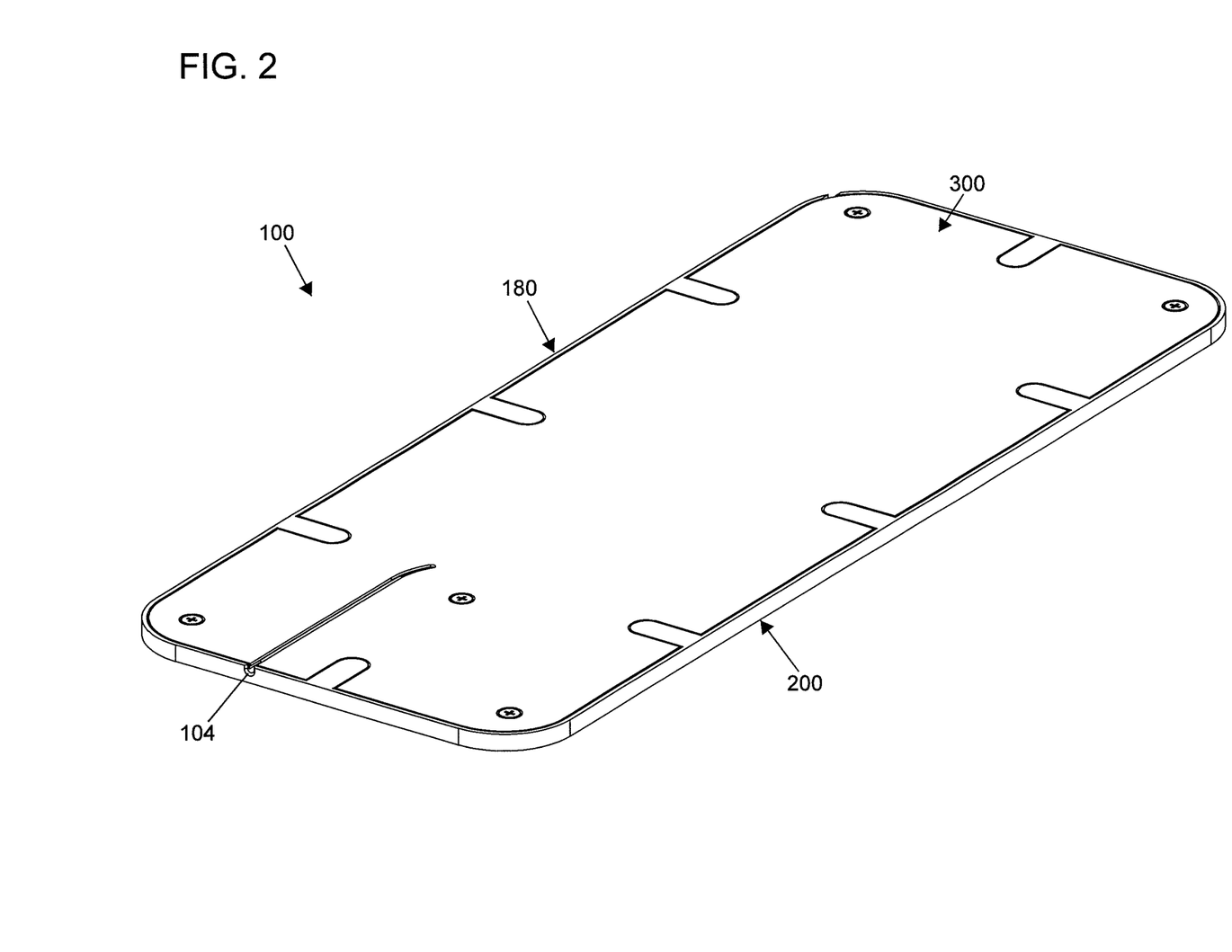
FIG. 2 is the perspective view of FIG. 1, but without the telecommunications cable.
Figure 3:
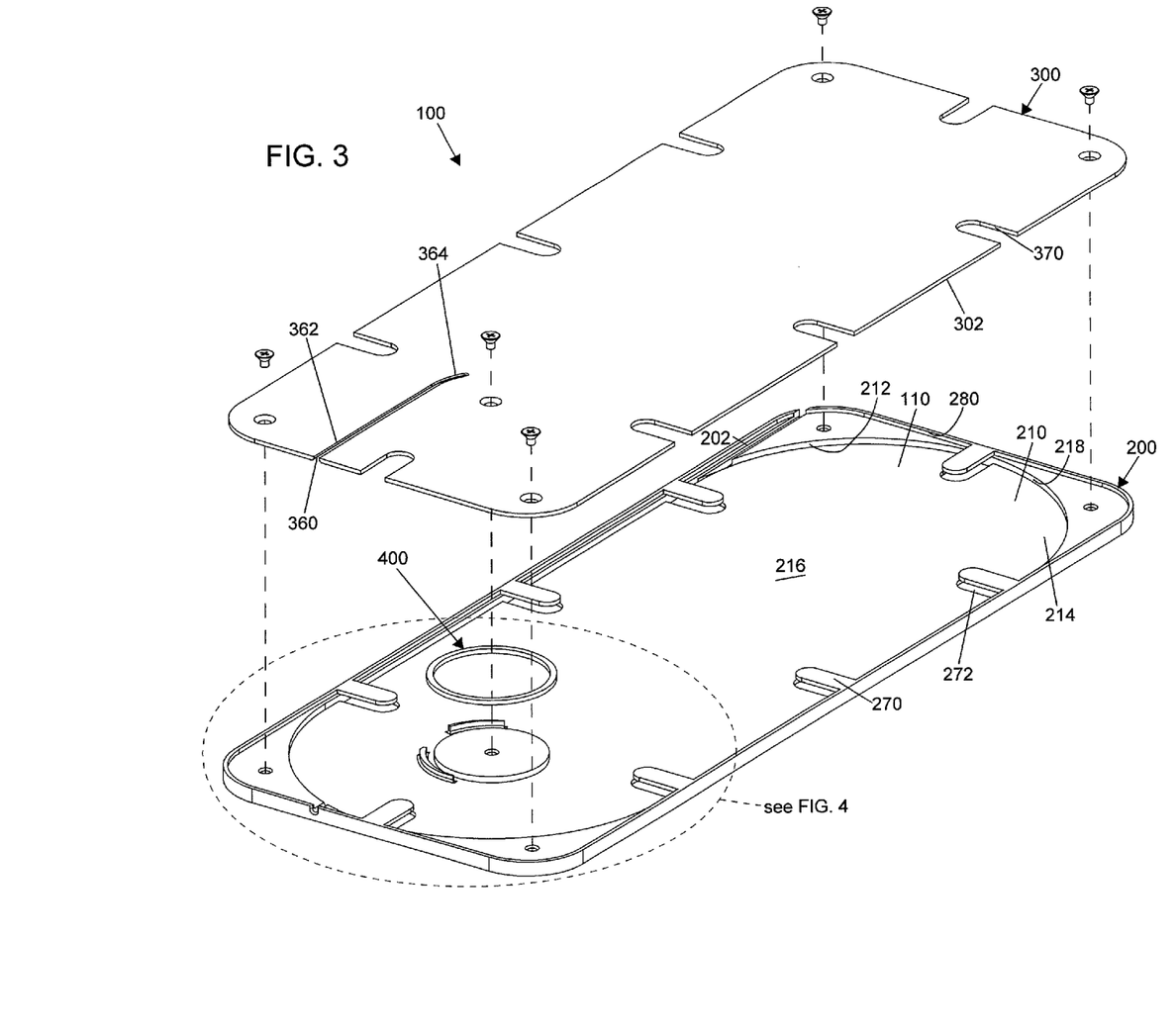
FIG. 3 is the perspective view of FIG. 2, but with a cover and an anti-friction device of the payout cassette exploded away from a main housing of the payout cassette.

As illustrated at FIGS. 2 and 3, the cassette assembly 100 includes a housing 180 that further includes the housing 200 and a cover 300. The housing 180 extends between a first side 182 and a second side 184, a first end 186 and a second end 188, and a first edge 190 and a second edge 192. Two or more of the cassette assemblies 100 may be stacked. For example, the first side 182 of a first of the cassette assemblies 100 may be placed adjacent to the second side 184 of a second of the cassette assemblies 100. The second ends 504 of the first and the second of the cassette assemblies 100 may be merged (e.g., continuous with each other) thereby creating a cassette assembly that can pay-out the telecommunications cable 500 from either of two ends (i.e., the first ends 502 of the first and the second of the cassette assemblies 100).

Figure 4:
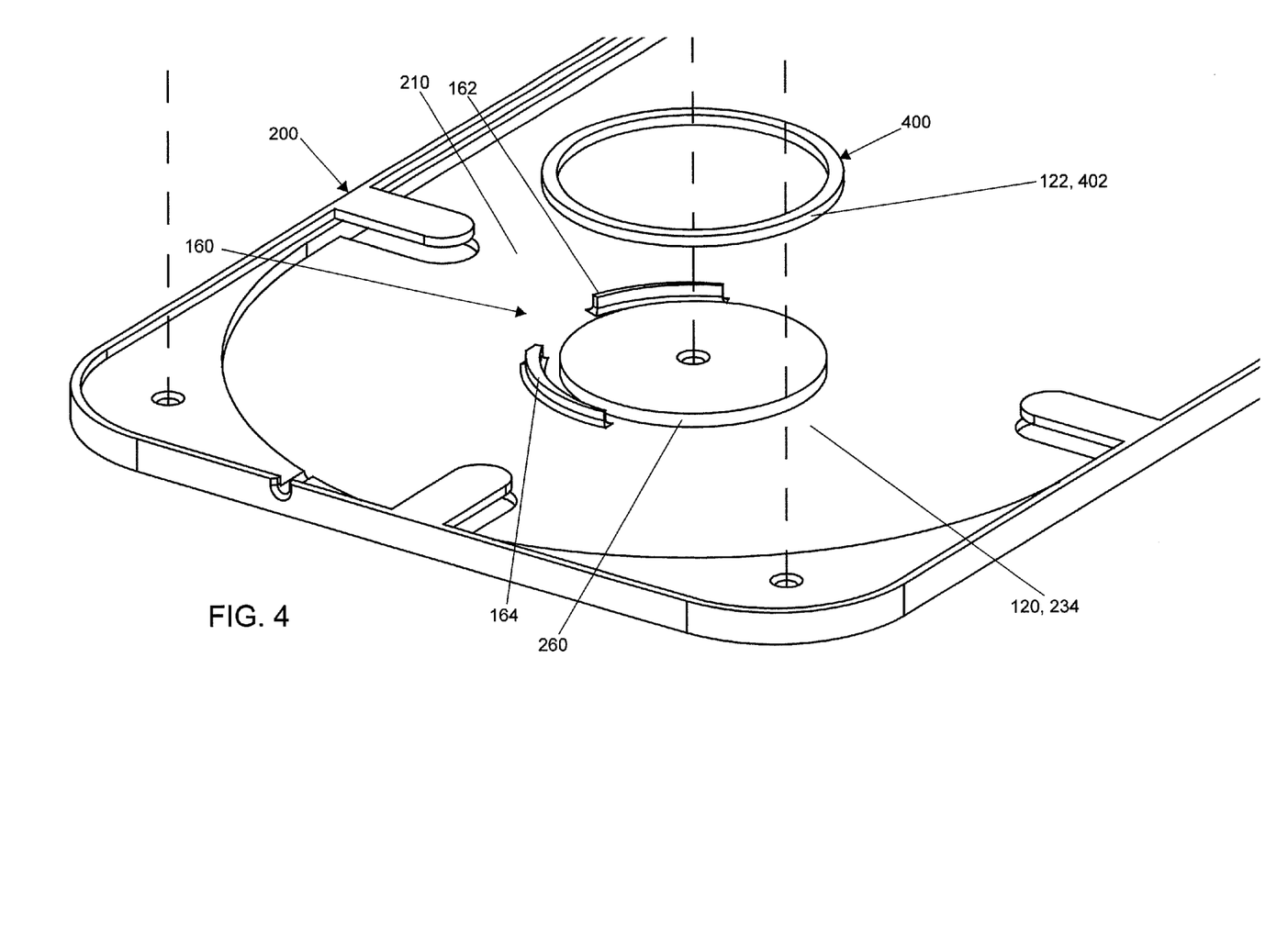
FIG. 4 is an enlarged portion of FIG. 3.

Turning now to FIGS. 3 and 4, the housing 200 (e.g., a base portion) includes a cavity 210 with a perimeter 212 and a first wrapping area 214 in the cavity 210 within and adjacent to the perimeter 212. The cavity 210 also includes a second wrapping area 234 that may serve as the wrapping area 120. A substantial majority of the telecommunications cable 500 may be initially loaded in the first wrapping area 214 of the cavity 210 adjacent the perimeter 212 in a series of the loops 510 that are positioned within the cavity 210 one layer deep (see FIG. 5). An initial loop $510_1$ (i.e., the outermost loop 510o) may begin at a cable passage 202. The cable passage 202 may be adjacent the perimeter 212 and may extend between the cavity 210 and an exterior 102 of the cassette 100 (see FIGS. 1, 5, and 6). The telecommunications cable 500 may continue from the initial loop $510_1$, $510o$ to the cable passage 202 and may be positioned within the cable passage 202 (i.e., an entrance passage). The initial loop $510_1$, $510o$ may be wrapped adjacent the perimeter 212 until the initial loop $510_1$, $510o$ has extended around the perimeter 212. The cable wrapping may continue with a second loop $510_2$ that is positioned adjacent the initial loop $510_1$, $510o$ and follows the initial loop $510_1$, $510o$ as it extends around the perimeter 212. Likewise, the cable wrapping may continue with a third loop $510_3$ that follows the second loop $510_2$, a fourth loop $510_4$ that follows the third loop $510_3$, etc. In certain embodiments, the initial loop $510_1$, $510o$ is initially wrapped in contact or near contact with the perimeter 212, thereby maximizing or substantially maximizing a length (i.e., a circumference) of the initial loop $510_1$, $510o$. Likewise, the second loop $510_2$ may be in contact or near contact with the initial loop $510_1$, $510o$ and thereby include a maximum length of the telecommunications cable 500. Likewise, the third loop $510_3$ may be in contact or near contact with the second loop $510_2$, and the fourth loop $510_4$ may be in contact or near contact with the third loop $510_3$, etc. As depicted, the telecommunications cable 500 may be wrapped in the first wrapping area 214 of the cavity 210 inside of (i.e., within an interior of) the perimeter 212.

The terminal portion 540 of the telecommunications cable 500 of the cassette 100 may extend from the cable passage 202 to the second end 504 of the telecommunications cable 500. In the depicted embodiment, the terminal portion 540 is not substantially extendable or retractable and is of a substantially fixed length.

As mentioned above, the telecommunications cable 500 tightens around the wrapping surface 122 of the wrapping area 120 within the storage area 110 when the cassette assembly 100 pays-out the telecommunications cable 500. In the depicted embodiment, the second wrapping area 234 of the cavity 210 serves as the wrapping area 120 (see FIG. 4), and a wrapping surface 402 of an annular ring 400 includes the wrapping surface 122. By having the wrapping surface 122 formed on the annular ring 400, friction may be reduced. The annular ring 400 may be made of a low-friction material (e.g., Teflon®) and thereby be an anti-friction device. The annular ring 400 may be rotatably mounted to a mount 260 that is attached to or part of the housing 180 (e.g., the main housing 200). In certain embodiments, the mount 260 may be attached to or part of the cover 300.

The cassette 100 further includes a transitioning area 160 for transitioning the telecommunications cable 500 from the storage area 110 to the exterior 102 of the cassette 100. As the telecommunications cable 500 is paid-out of the storage area 110 of the cassette 100, the telecommunications cable 500 within the storage area 110 generally transfers through the transitioning area 160 and on to the exterior 102 of the cassette 100 where it continues on toward a deployed area.

The transitioning area 160 includes a first cable guide 162 that is spaced away from the annular ring 400 and extends circumferentially around the annular ring 400 along an arc segment. In the depicted embodiment, the arc segment is concentric with the annular ring 400. In the depicted embodiment, the first cable guide 162 is spaced from the annular ring 400 by a space 410 (e.g., a distance) sufficient to route a single strand of the telecommunications cable 500 between the first cable guide 162 and the annular ring 400. In the depicted embodiment, a second cable guide 164 is positioned immediately adjacent the annular ring 400. In the depicted embodiment, the second cable guide 164 may have a small clearance with the annular ring 400. The small clearance, as depicted, is not sufficient in size to receive a strand of the telecommunications cable 500. In the depicted embodiment, the first and the second cable guides 162, 164 are formed on the housing 200 of the cassette 100.

The cassette 100 further includes a third cable guide 360. As depicted, the third cable guide 360 is in the form of a slot (i.e., a slit). In the depicted embodiment, the slot extends through the cover 300 of the housing 180. In other embodiments, the third cable guide 360 may be formed as a channel and thereby may not necessarily extend through the cover 300. The third cable guide 360 includes a straight segment 362 and a curved segment 364 that is tangent to the straight segment 362. The curved segment 364 generally follows and continues along a path of the space 410 between the first cable guide 162 and the annular ring 400.

Figure 5:
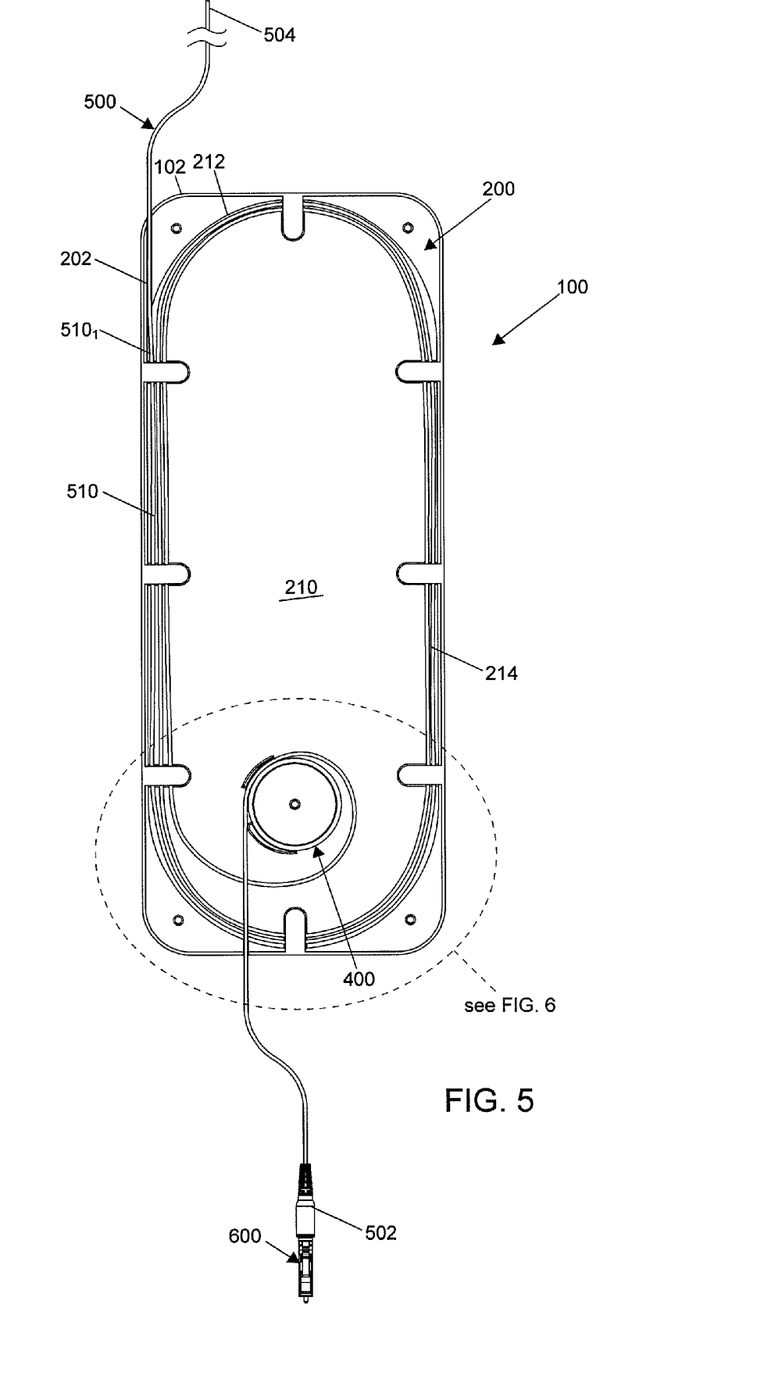
FIG. 5 is a top plan view of the payout cassette of FIG. 1 with the cover of FIG. 3 removed and a currently stored portion of the telecommunications cable substantially equal to an initially stored portion of the telecommunications cable.
Figure 6:
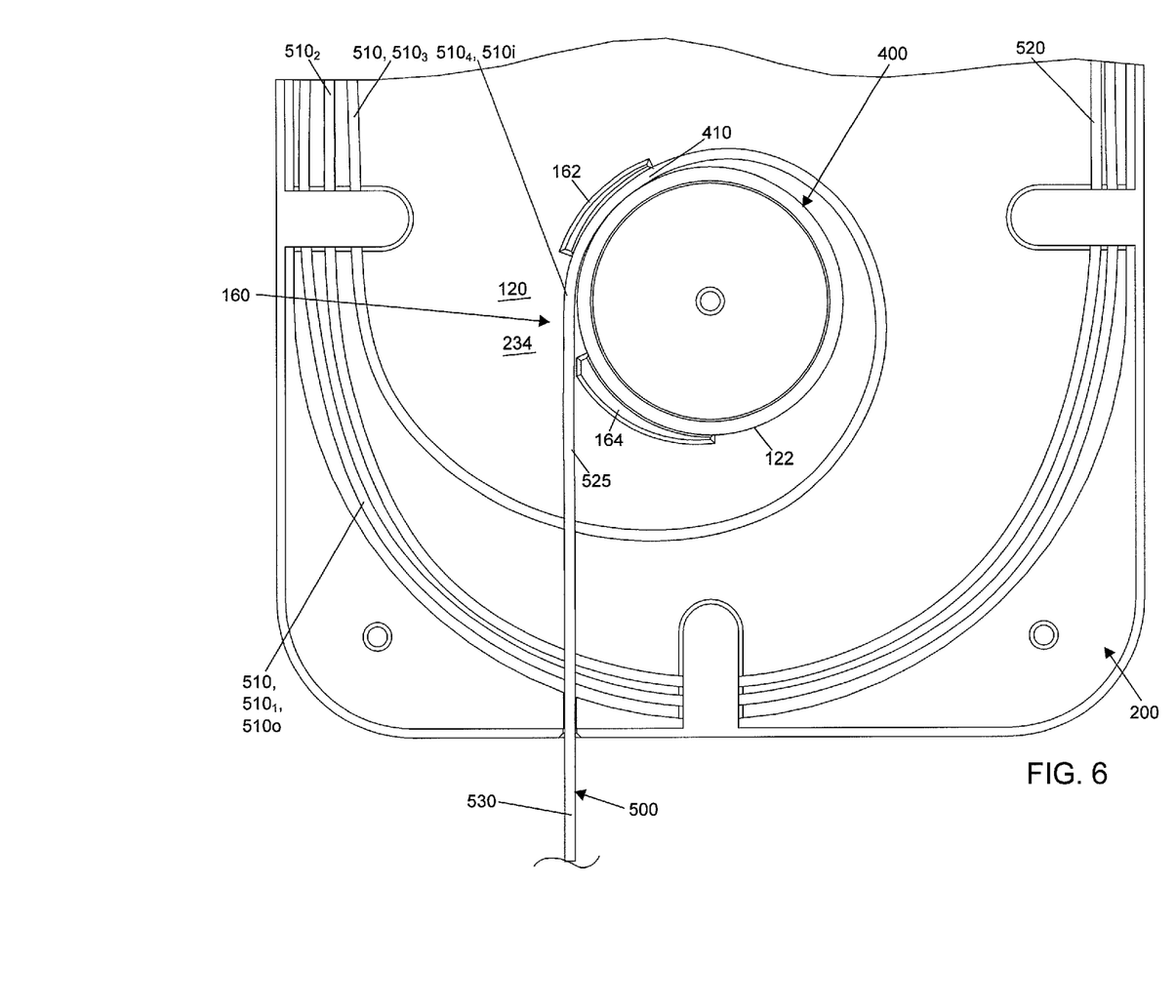
FIG. 6 is an enlarged portion of FIG. 5.

As illustrated at FIGS. 5 and 6, when the cassette 100 is holding a maximum length of the telecommunications cable 500 or near the maximum length of the telecommunications cable 500, the outermost loop $510_1$, $510o$, the second loop $510_2$, the third loop $510_3$, etc. follow the perimeter 212 of the storage cavity 210, as mentioned above. Upon a cable route reaching the innermost loop $510i$, the telecommunications cable 500 departs from following the perimeter 212 and veers toward the annular ring 400. The telecommunications cable 500 is routed between the first cable guide 162 and the annular ring 400 and then through the curved portion 364 of the third cable guide 360. Along the third cable guide 360, the telecommunications cable 500 is elevated above the previous loops $510_{1-4}$ and progressively is positioned at an elevation of the cover 300 within the third cable guide 360. The third cable guide 360 continues until it reaches an edge of the cover 300. The telecommunications cable 500 follows the third cable guide 360 and continues past the edge of the cover 300 toward the exterior 102 of the cassette 100. The third cable guide 360 thereby forms at least a portion of an exit 104 for the telecommunications cable 500 as it leaves (i.e., exits) the cassette 100. The second cable guide 164 may assist in preventing the telecommunications cable 500 from following the annular ring 400 and may peel the telecommunications cable 500 from the annular ring 400 and direct the telecommunications cable 500 toward the third cable guide 360. A space may be created between the second cable guide 164 and the first cable guide 162 adjacent a portion of the circumference of the annular ring 400 so that as the telecommunications cable 500 winds around the annular ring 400 and exits, the telecommunications cable 500 does not get pinched and thereby prevented from being pulled out. The transitioning area 160 may include the space between the second cable guide 164 and the first cable guide 162.

As depicted, the main housing 200 of the housing 180 includes a series of fingers 270 that project inwardly. The series of the fingers 270 are spaced at the elevation of the cover 300 and form a space 272 with a bottom surface 216 of the cavity 210 that is substantially equal to a space 218 between an interior 302 of the cover 300 and the bottom surface 216 of the cavity 210. The space 218 keeps the series of the loops 510 positioned within the cavity 210 at the one layer deep.

The fingers 270 may provide a convenient holding arrangement for initially wrapping the loops 510 of the telecommunications cable 500 about the perimeter 212. The cover 300 may include a series of notches 370 or recesses that match the fingers 270 of the housing 200. The housing 200 may include a flange 280 that extends around an outer perimeter of the housing 200. The cover 300 may fit inside the flange 280. The flange 280 may include an opening aligned with the third cable guide 360 that allows the telecommunications cable 500 to exit through the flange 280 at the exit 104.

Figure 7:
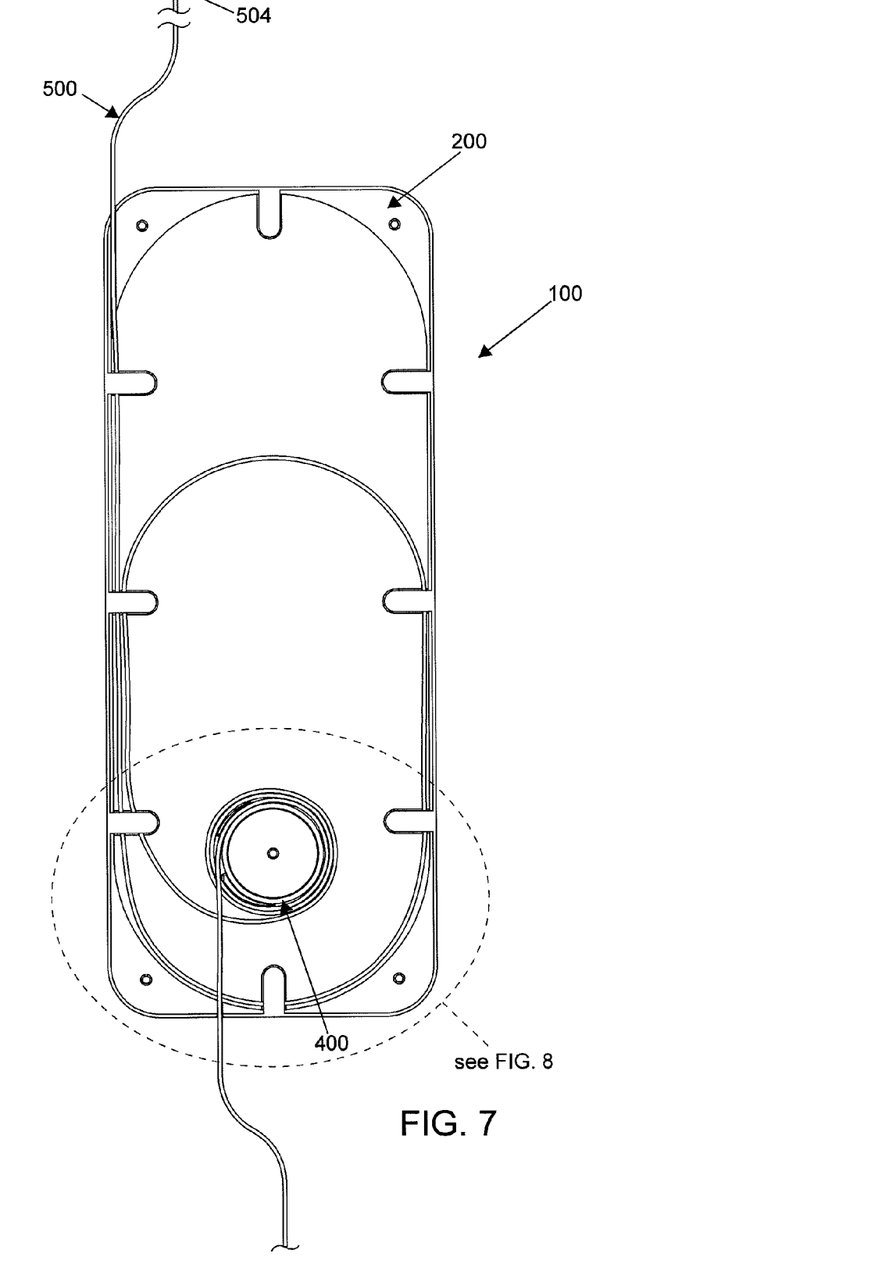
FIG. 7 is the top plan view of FIG. 5, but with some of the initially stored portion of the telecommunications cable having been transferred to the paid-out portion of the telecommunications cable.
Figure 8:
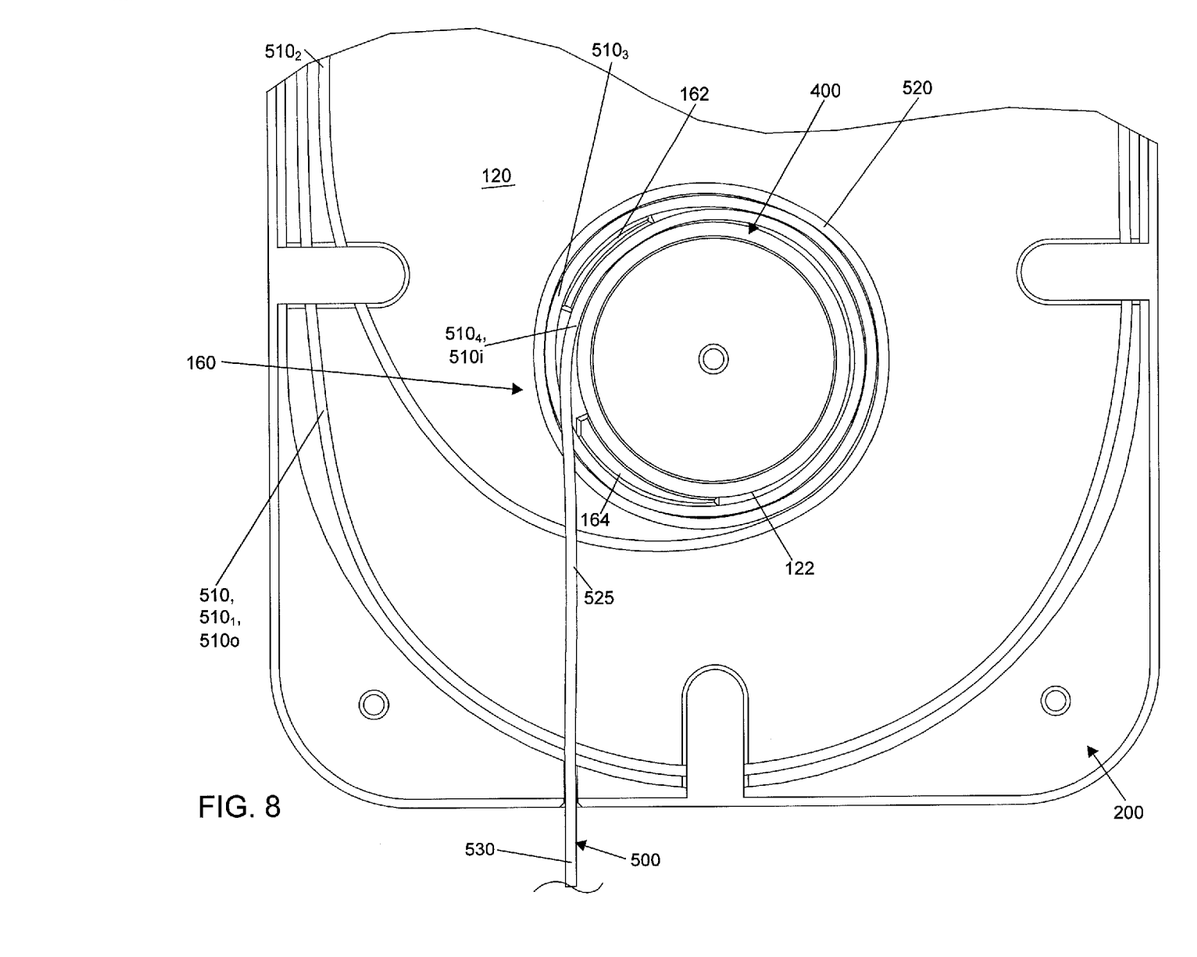
FIG. 8 is an enlarged portion of FIG. 7.
Figure 9:
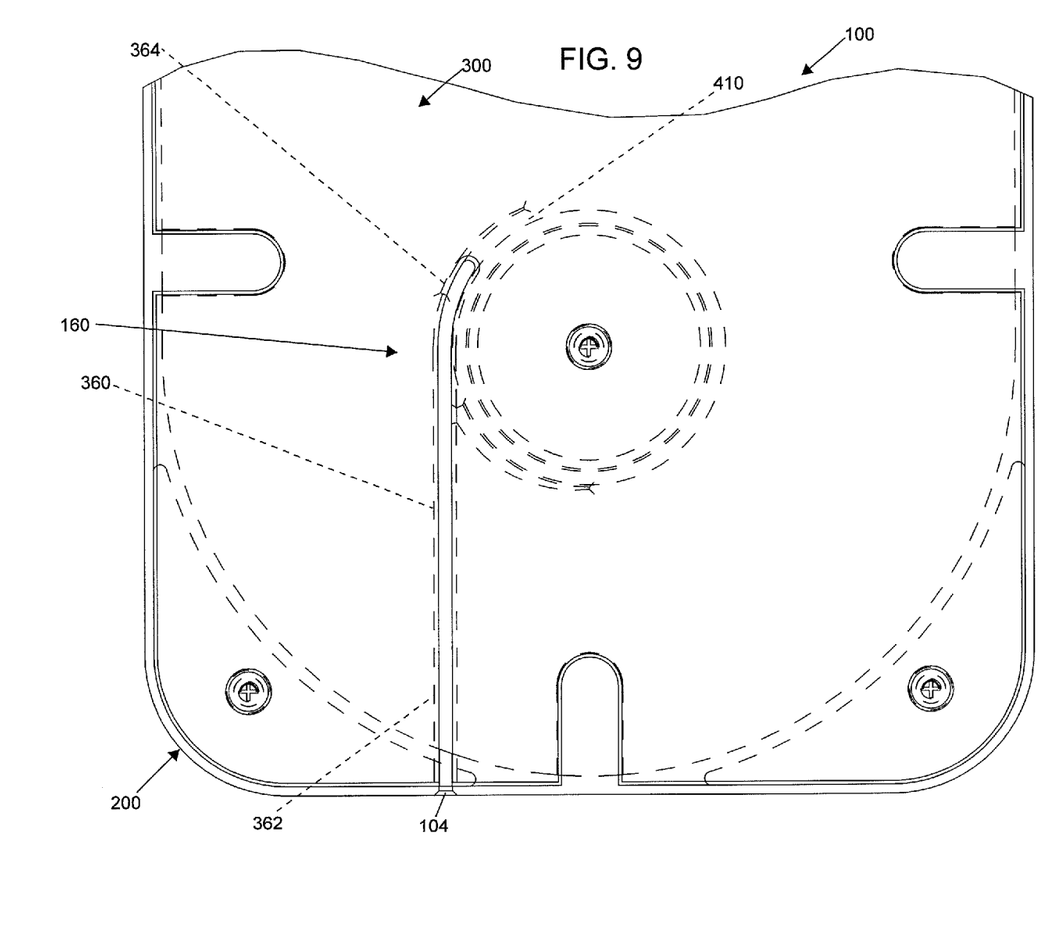
FIG. 9 is similar to the view of FIG. 8, but with the cover of FIG. 3 installed and the telecommunications cable of FIG. 1 removed.

As illustrated at FIGS. 7 and 8, upon the deployment of the telecommunications cable 500, the loops 510 transition from being positioned adjacent the perimeter 212 to being positioned adjacent or partially adjacent to the annular ring 400. In particular, the innermost loop 510$i$ draws the telecommunications cable 500 from the second to the most innermost loop (510$_3$ as depicted at FIG. 8) as the telecommunications cable 500 is deployed from the cassette 100. As the second to the most innermost loop is drawn toward the rotating ring 400, it is positioned on an opposite side of the first cable guide 162 from the innermost loop 510$i$. As the telecommunications cable 500 continues to be deployed, portions of the telecommunications cable that were in the innermost loop 510$i$ exit through the transition area 160 and toward the exterior 102 of the cassette 100. The telecommunications cable 500 that has left the innermost loop 510$i$ is replaced by the telecommunications cable 500 that is drawn from the second to the most innermost loop. This results in the second to the most innermost loop becoming smaller and drawing material from the third to the most innermost loop. This process continues until all of the telecommunications cable 500 that was positioned at the perimeter 212 of the cavity 210 is now positioned adjacent the rotating ring 400 and/or has exited the cassette 100. The number of loops N of the telecommunications cable 500 within the storage area 110 may remain constant during the cable deployment process. The length of each loop 510 is decreased in magnitude (i.e., circumference) thereby supplying the length of the telecommunications cable 500 that is deployed.

In the depicted embodiment, the cavity 210 is an obround shape that includes semicircular ends spaced from each other. In other embodiments, the cavity 210 may have other shapes (e.g., circular, oval, etc.). In the depicted embodiment, the rotating ring 400 is positioned concentric to the semicircular end positioned opposite the cable entrance 202.

In preferred embodiments, features within the cassette 100 are shaped to provide bend radius protection to a fiber optic cable.

The first end 502 and/or the second end 504 of the telecommunications cable 500 may be connectorized by a connector 600 (e.g., a fiber optic connector).

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A cassette for storing and paying-out a telecommunications cable having a cross-dimension, the cassette comprising:
    a storage area adapted to store a stored portion of the telecommunications cable, the storage area including a first cable constraining surface spaced a distance from a second cable constraining surface, the storage area extending between the first and the second cable constraining surfaces, the first and the second cable constraining surfaces being positioned generally parallel to each other, the distance being sufficiently large to allow the cross-dimension of the telecommunications cable to slide between the first and the second cable constraining surfaces, and the distance being sufficiently small to prevent a first portion of the stored portion of the telecommunications cable from crossing over a second portion of the stored portion of the telecommunications cable within the storage area;
    a transitioning area adapted to transition the telecommunications cable from the stored portion within the storage area to a paid-out portion of the telecommunications cable external to the storage area, the transitioning area being at least partially positioned within an interior of the storage area.

2. The cassette of claim 1, wherein the first and the second cable constraining surfaces are generally each planar.

3. The cassette of claim 1, wherein the cross-dimension of the telecommunications cable is a minimum cross-dimension.

4. The cassette of claim 1, wherein a cross-section of the telecommunications cable is generally circular and the cross-dimension generally corresponds to a diameter.

5. The cassette of claim 1, wherein the storage area includes a wrapping area generally positioned between the first and the second cable constraining surfaces, the wrapping area including a wrapping surface.

6. The cassette of claim 5, wherein the wrapping surface includes an anti-friction surface.

7. The cassette of claim 6, wherein the anti-friction surface includes a rotating member rotatably mounted to at least one of the cable constraining surfaces.

8. The cassette of claim 5, wherein the transitioning area includes a first cable passage adapted to transfer the telecommunications cable from the wrapping area to the paid-out portion of the telecommunications cable.

9. The cassette of claim 8, further comprising a second cable passage adapted to transition the telecommunications cable from a terminal portion of the telecommunications cable to the stored portion of the telecommunications cable.

10. The cassette of claim 9, wherein the telecommunications cable extends from a first end at the paid-out portion of the telecommunications cable to a second end at the terminal portion of the telecommunications cable.

11. The cassette of claim 5, wherein a segment of an inner-most loop of the stored portion of the telecommunications cable is positioned between the wrapping surface and a first cable guide of the cassette.

12. The cassette of claim 11, wherein the first cable guide forms a portion of the transitioning area.

13. The cassette of claim 12, wherein the first cable guide is a ramp.

14. The cassette of claim 11, further comprising a second cable guide adjacent a segment of the wrapping surface, the second cable guide adapted to peel the telecommunications cable from the wrapping surface as the telecommunications cable is paid-out.

15. The cassette of claim 14, wherein the second cable guide forms a portion of the transitioning area.

16. The cassette of claim 14, further comprising a third cable guide positioned outside the storage area and positioned adjacent the first and the second cable guides.

17. The cassette of claim 16, wherein the third cable guide forms a portion of the transitioning area.

18. The cassette of claim 16, wherein the third cable guide has a slot-like configuration.

19. The cassette of claim 1, further comprising a housing including a cover and a base, wherein the first cable constraining surface is included on the base and the second cable constraining surface is included on the cover.

20. The cassette of claim 16, further comprising a housing including a cover and a base, wherein the first cable constraining surface is included on the base and the second cable constraining surface is included on the cover, wherein the first and the second cable guides are included on the base, and wherein the third cable guide is included on the cover.

* * * * *